United States Patent [19]
McKenzie et al.

[11] Patent Number: 5,944,339
[45] Date of Patent: Aug. 31, 1999

[54] INTEGRATED AXLE SUSPENSION ANTI-ROLL ARRANGEMENT FOR PUSH-PULL SUSPENSION

[75] Inventors: Thomas McKenzie, Spring Lake, Mich.; Ervin K. VanDenberg, Massillon, Ohio

[73] Assignee: Meritor Heavy Vehicle Systems, LLC, Troy, Mich.

[21] Appl. No.: 08/851,108

[22] Filed: May 6, 1997

[51] Int. Cl.[6] ............................................. B06G 5/00
[52] U.S. Cl. ................................. 280/678; 280/683
[58] Field of Search ............................ 280/678, 683

[56] References Cited

U.S. PATENT DOCUMENTS

| | | | |
|---|---|---|---|
| 3,154,321 | 10/1964 | McLean. | |
| 4,202,564 | 5/1980 | Strader | 280/678 |
| 4,530,515 | 7/1985 | Raidel | 280/683 |
| 5,016,905 | 5/1991 | Licari | 280/678 |
| 5,127,668 | 7/1992 | Raidel | 280/683 |
| 5,335,932 | 8/1994 | Pierce | 280/188 |

FOREIGN PATENT DOCUMENTS

| | | |
|---|---|---|
| 1220845 | 5/1960 | France. |
| 7210844 | 11/1972 | France. |
| 2609369 | 9/1977 | Germany. |

*Primary Examiner*—Kenneth R. Rice
*Attorney, Agent, or Firm*—Howard & Howard

[57] ABSTRACT

An improved suspension system includes a central bracket that pivotally receives box beams fixed to each lateral side of the axles of each wheel. The combined spaced box beams and axle move as a unit, to provide roll stability to the suspension. The invention eliminates the need for any separate stabilizer bar.

20 Claims, 2 Drawing Sheets

ND AXLE SUSPENSION ANTI-
INTEGRATED AXLE SUSPENSION ANTI-ROLL ARRANGEMENT FOR PUSH-PULL SUSPENSION

BACKGROUND OF THE INVENTION

This invention relates to a push-pull type suspension wherein the axle is integrated to the suspension members to provide roll stability.

Trailer suspension systems must overcome numerous forces. During travel, the suspension system must provide adequate stability to the vehicle wheels to resist vibration and bouncing. In addition, roll stability must also be provided to maintain the proper position of the wheels as the trailer rounds a turn.

Often, trailer wheels are mounted on a slider. A slider is a carriage which mounts two sets of wheels and associated suspensions, brakes, air springs, etc. The slider may be moved along the length of the trailer, and fixed at any of several desired locations.

One problem that has occurred with such suspension systems is "dock walk." A trailer fixed at a loading dock has sometimes reacted to forces such as a bump at the back of the trailer by "walking" or moving a distance in response to the bump.

To resist dock walk, so-called "push-pull" suspensions have been developed. In this type suspension, the slider has a central bracket which extends downwardly between two wheels. Suspensions from the two wheels both extend to the central bracket. Thus, should a force be applied to the bracket from a first wheel, the other wheel experiences an equal and opposite force. The forces on the bracket cancel, and thus there is no force transmitted to the vehicle frame. This type of suspension system resists dock walk quite successfully. One well known type of such suspension includes a parallelogram-type suspension. Known parallelogram suspensions have proven successful in resisting dock walk, and in providing good suspension and resistance to vertically upward or downward forces on the wheels.

One problem with this general class of known suspensions, is that they have poor roll stability. When the trailer is turning a corner, the forces on the outer wheel are greater than those on the inner wheel. The suspension must resist the tendency to roll away from the greater force. In some suspensions, the roll stability has been less than desired.

One recently developed suspension utilizes a crossing stabilizer bar which extends between spaced parallelogram suspensions on opposed sides of the vehicle. This stabilizer bar adequately provides roll stability, but does increase the weight of the system. In some applications, it may be desirable to provide a lighter roll stabilizer structure.

SUMMARY OF THE INVENTION

In a disclosed embodiment of this invention, a central stabilizer bracket is positioned on a slider between two spaced vehicle wheels. Suspension members are fixed to both axial ends of each of the axles. The suspension members in this application are specifically disclosed as rigid box beams. However, other suspension members such as springs, or other known types of suspension members may also be utilized. The main functional feature of this invention is that the suspension members are fixed to the axial such that the axial has a suspension member fixed to each of its ends. In that way, the axle provides roll stability to the two suspension members. The suspension members are pivotally attached in the frame bracket. The suspension members provide a push-pull suspension in combination with the central bracket. The axle, which is fixed to both suspension members provides roll stability. The use of the axle as the roll stabilizer eliminates the prior stabilizer bar, and its attendant weight.

In preferred features of this invention, air springs are fixed to the box beams at a location opposed to the connection of the axle. In preferred embodiments, the air springs are mounted to the box beams at an angled bracket surface. In one embodiment, this angled surface is angled vertically downwardly and on a side of the axle spaced from the central bracket. In a second embodiment, this angled surface is angled vertically upwardly, and on a side of the axle spaced towards the central bracket. Most preferably, the suspension system is utilized in a system utilizing anti-lock brakes.

Preferred features of this invention will be best understood with reference to the following specification and drawings, of which the following is a brief description.

DETAILED DESCRIPTION OF A PREFERRED EMBODIMENT

Figure 1:
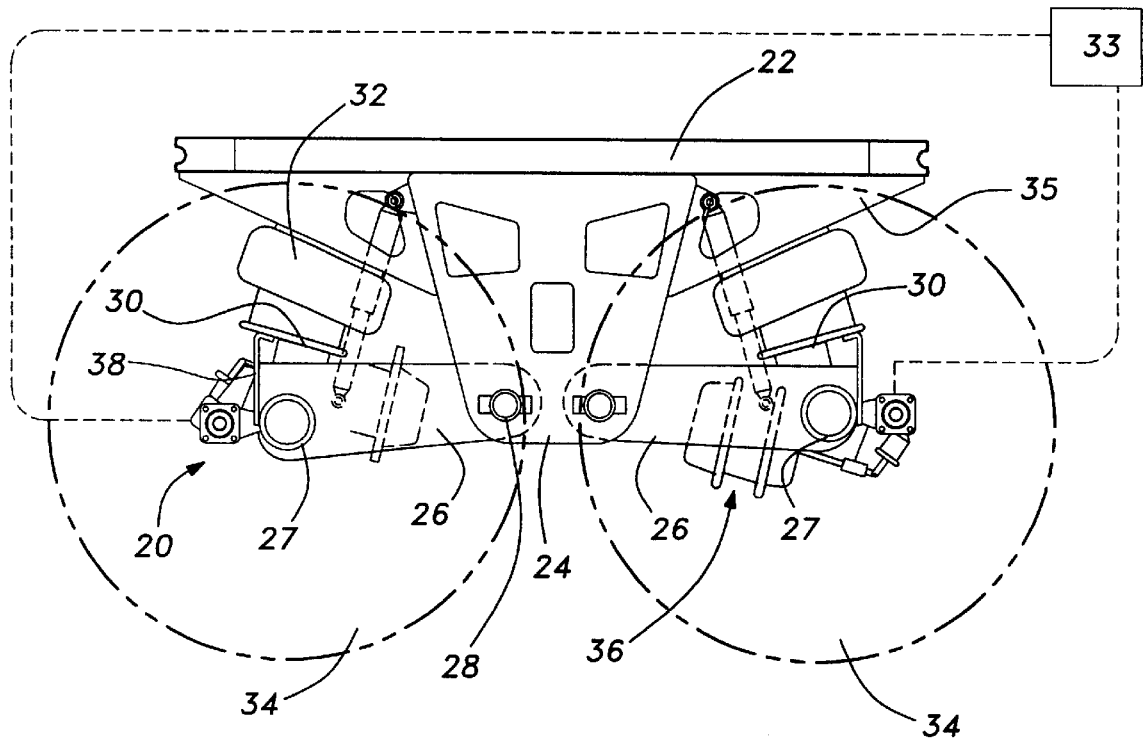
FIG. 1 is a side view of a portion of a trailer incorporating the present invention.

A vehicle trailer support system 20 is shown in FIG. 1. A slider frame 22 is selectively moveable along a trailer frame. A central bracket 24 extends vertically downwardly from frame 22. Box beams 26 extend from both sides of the central bracket 24. Pivot mounts 28 mount the box beams 26 in the central bracket 24. An angled upper surface 30 of the box beams is bolted to an air spring 32. Air springs 32 are mounted to angle brackets 35 which are in turn fixed to the frame 22. In this embodiment, the angled surface 30 extends vertically upwardly from a location spaced toward the central frame, and over the axle 27.

Each box beam 26 and an opposed box beam 26, spaced into the paper at the opposed side of the trailer, are fixed to an associated axle 27. These systems are utilized on non-driven axles, and thus the axle 27 need not rotate.

A braking system 36 is shown schematically associated with each wheel 34. An anti-lock brake control 37 is preferably incorporated into this system, and is shown here schematically. The details of this invention do not extend to the braking system, however, the invention has increased benefits when utilized with anti-lock brake systems.

Figure 2:
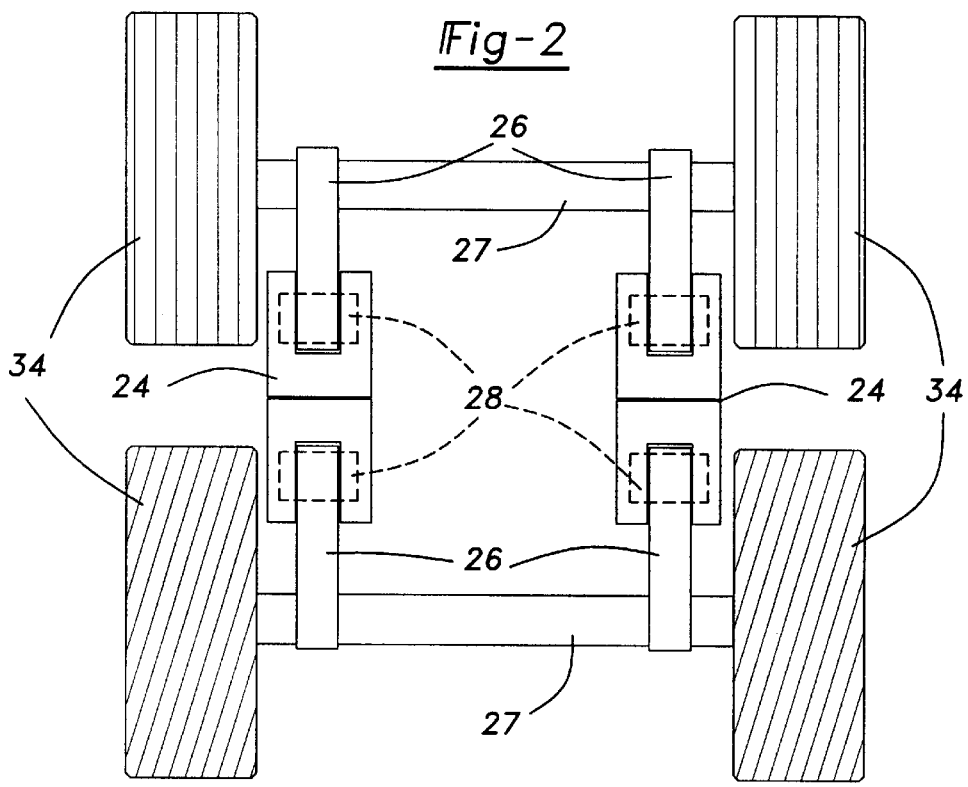
FIG. 2 is a schematic plan view of the present invention.

FIG. 2 is a schematic view of the present invention. As shown, central bracket 24 includes pivot bushings 28 which mount the box beams 26. Axles 27 extend between the box beams 26. The axles may be welded, or alternatively fixedly secured to the box beams 26 in any known fashion.

Figure 3:
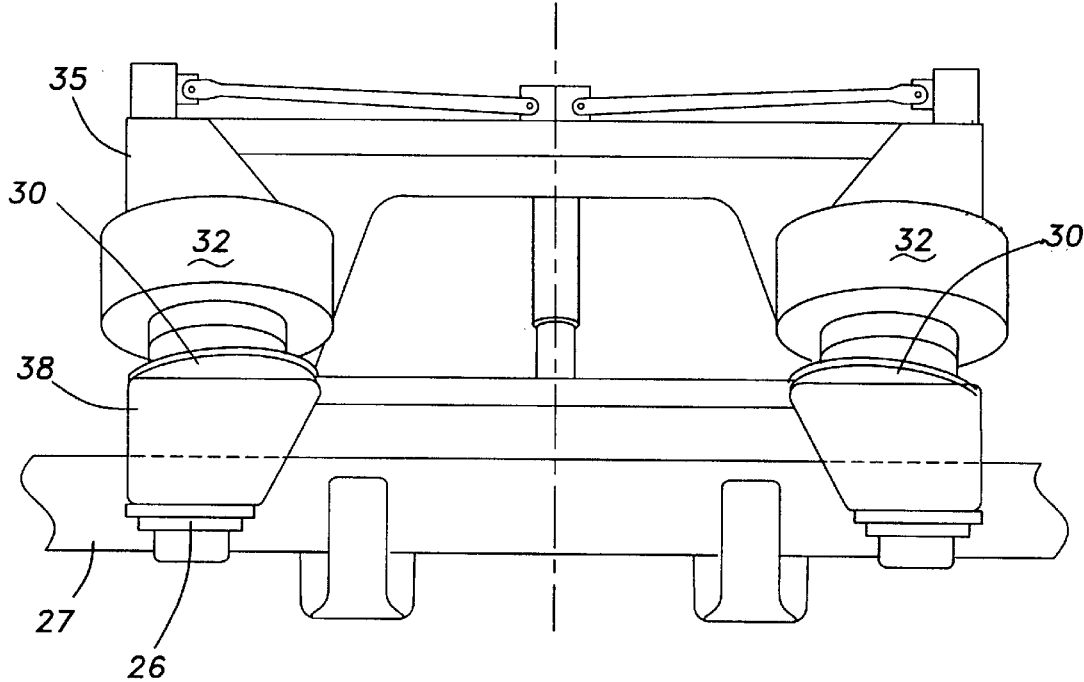
FIG. 3 shows a rear view of the present invention.

As shown in FIG. 3, a rear view of the FIG. 2 structure shows that the angled surfaces 30 include a plate 38 which is fixed to the rigid box beam 26. The plate 38 thus provides a good reaction surface for the air spring 32. In addition, the plate 38 can be seen to extend for a greater distance along the axis of the axle than does the suspension member. In this way, it is insured that the surface 30 will provide adequate reaction area.

Figure 4:
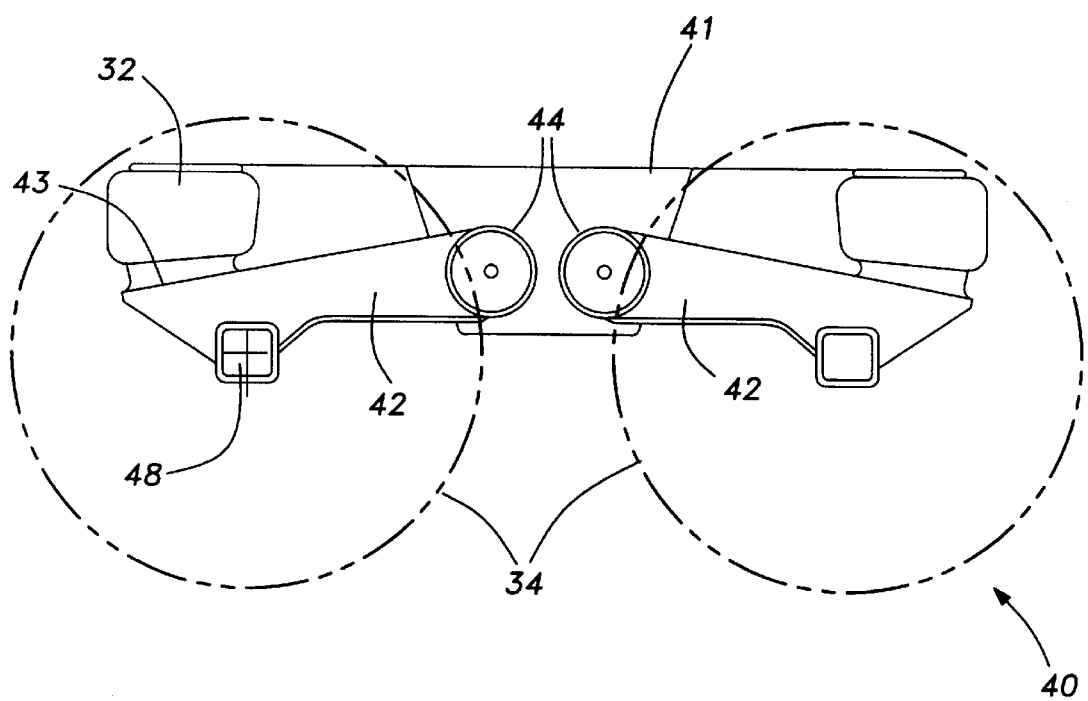
FIG. 4 shows a second embodiment of the present invention.

A second embodiment 40 is illustrated in FIG. 4. Second embodiment 40 is similar to the first embodiment, in that it has the box beams 42 at each lateral side of a trailer fixed to axle 48, shown as a square axle. Air spring 32 is again fixed to the box beam at an angled surface 43. The angled surface in this embodiment extends vertically downwardly, and on a side of the axle 48 spaced from the central bracket 41. The pivot connection 44 of the box beam 42 to the central bracket 41 may be similar to the first embodiment.

The operation of the suspension system will be explained with reference to FIG. 1 or FIG. 4. With regard to either embodiment, if a force is applied to the wheel tending to move the wheel upwardly or downwardly, this movement will be opposed by the air spring 32, and the movement will be accommodated by pivoting of the box beam 26 upwardly or downwardly at pivot point 28. Of course, as one box beam 26 moves, its fixed axle 27 or 48 also move.

At the same time, when the vehicle is turning, the axles (27, 48) provide roll stability to the two spaced box beams 26 such that the trailer is properly supported around turns. By utilizing the axle in this fashion, the present invention provides a lateral and roll stabilizer bar.

Although rigid box beams are disclosed in this application, it should be understood that other suspension members such as springs, etc., may also be utilized. The main functional requirement is that the suspension members be attached to the axle such that the axle provides roll stability. As shown in FIG. 3, the suspension member 26 is fixed to the axle 27 as by welding.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A vehicle suspension system comprising:
    a frame extending longitudinally and having central brackets fixed to said frame and extending vertically downwardly and at opposed lateral sides of the vehicle;
    wheels mounted both forwardly and rearwardly of each said central bracket at each lateral side of said frame;
    axles connecting pairs of said wheels at each lateral side of said frame; and
    a suspension member fixed to each said axle at each lateral side, and pivotally mounted in said central bracket at different axes such that one of said suspension members at each lateral side of said vehicle are fixed to move with said axle as a single suspension element.

2. A suspension system as recited in claim 1, wherein an air spring is fixed to the top of each of said suspension members.

3. A suspension system as recited in claim 2, wherein an angled surface mounts said air spring to said suspension member.

4. A suspension system as recited in claim 3, wherein said angled surface extends for a greater distance along an axis of said axle than does said suspension member.

5. A suspension system as recited in claim 3, wherein said angled surface is angled vertically downwardly and extending to a side of said axle spaced away from said central bracket.

6. A suspension system as recited in claim 3, wherein said angled surface extends vertically upwardly from a side spaced toward said central bracket relative to said axle.

7. A suspension system as recited in claim 1, wherein said axle is round.

8. A suspension system as recited in claim 1, wherein said axle is square.

9. A suspension system as recited in claim 1, wherein said suspension members are mounted in said central brackets with a resilient bushing.

10. A suspension system as recited in claim 1, wherein an anti-lock brake system is associated with said wheels.

11. A suspension system as recited in claim 1, wherein said frame is a slider frame for use on vehicle trailers.

12. A suspension system as recited in claim 1, wherein said suspension member is a rigid unit.

13. A suspension system as recited in claim 1, wherein said rigid suspension members are box beams.

14. A slider system for use with a vehicle trailer comprising:
    a slider frame for being mounted at selected positions along a trailer, central brackets fixed to said frame and extending downwardly from said slider frame at each lateral side of said slider frame;
    two wheels mounted at each lateral side of said slider, with one of said wheels being positioned forwardly of said central bracket and the other wheel of each of said pair being positioned rearwardly of said bracket such that there are opposed laterally spaced wheels on each lateral side of said bracket, and both forwardly and rearwardly of said bracket;
    an axle extending between each of said laterally spaced wheels; and
    rigid suspension member fixed at each lateral side of each of said axles and pivotally mounted in said central bracket at different axes, such that each of said axles being fixed to move as an integrated unit with a pair of laterally spaced rigid suspension members.

15. A suspension system as recited in claim 14, wherein an air spring is fixed to the top of each of said rigid suspension members.

16. A suspension system as recited in claim 15, wherein an angled surface mounts said air spring to said rigid suspension member.

17. A suspension system as recited in claim 16, wherein said angled surface is angled vertically downwardly and extending to a side of said axle spaced away from said central bracket.

18. A suspension system as recited in claim 16, wherein said angled surface extends vertically upwardly and from a side spaced toward said central bracket relative to said axle.

19. A suspension system as recited in claim 16, wherein a plate portion is fixed to said rigid suspension member, and provides said angled surface.

20. A suspension system for a vehicle comprising:
    a vehicle frame, with brackets fixed to said frame and extending downwardly from said frame on each lateral side;
    wheels mounted at each lateral side of said frame;
    an axle extending between each of said laterally spaced wheels; and
    suspension members fixed at each lateral side of each axle and pivotally mounted in said bracket at different axes, such that each of said axle is being fixed to move as an integrated unit with a pair of laterally spaced suspension members.

* * * * *